Figure 7:
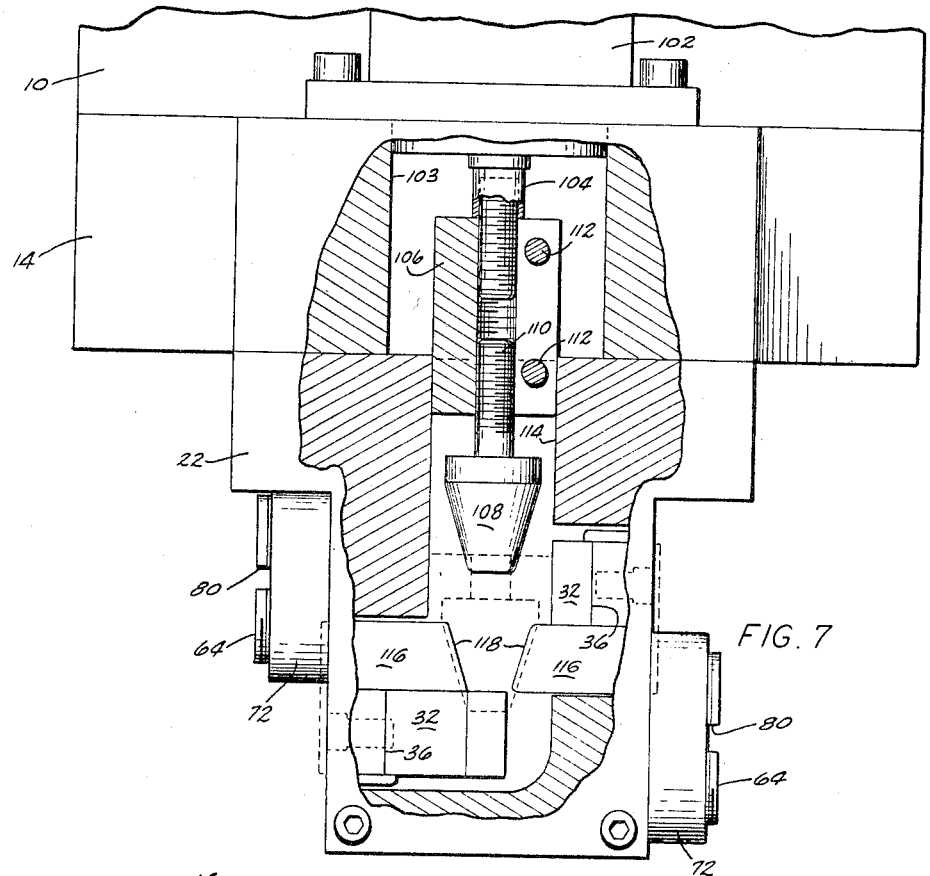

Nov. 1, 1966  A. L. ESTRY ET AL  3,281,919
DIAMOND BURNISHING APPARATUS
Filed Jan. 21, 1965  3 Sheets-Sheet 1
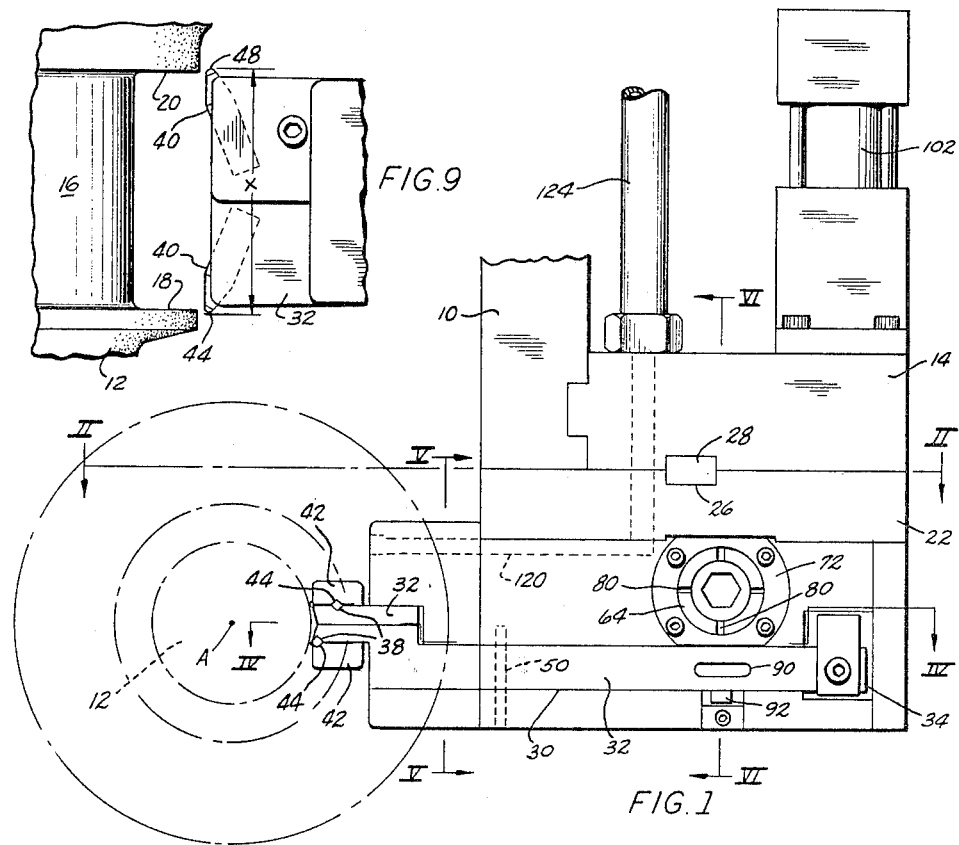
INVENTORS
ARTHUR L. ESTRY
SAMUEL M. WORTHINGTON
BY Beaman & Beaman
ATTORNEYS

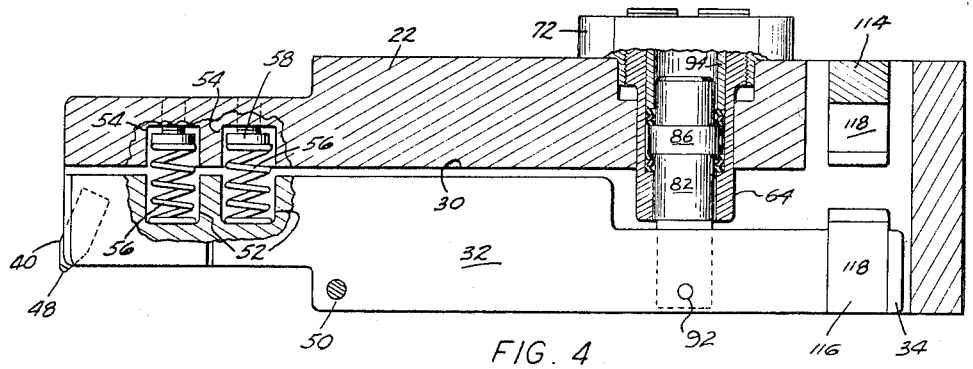
FIG. 4
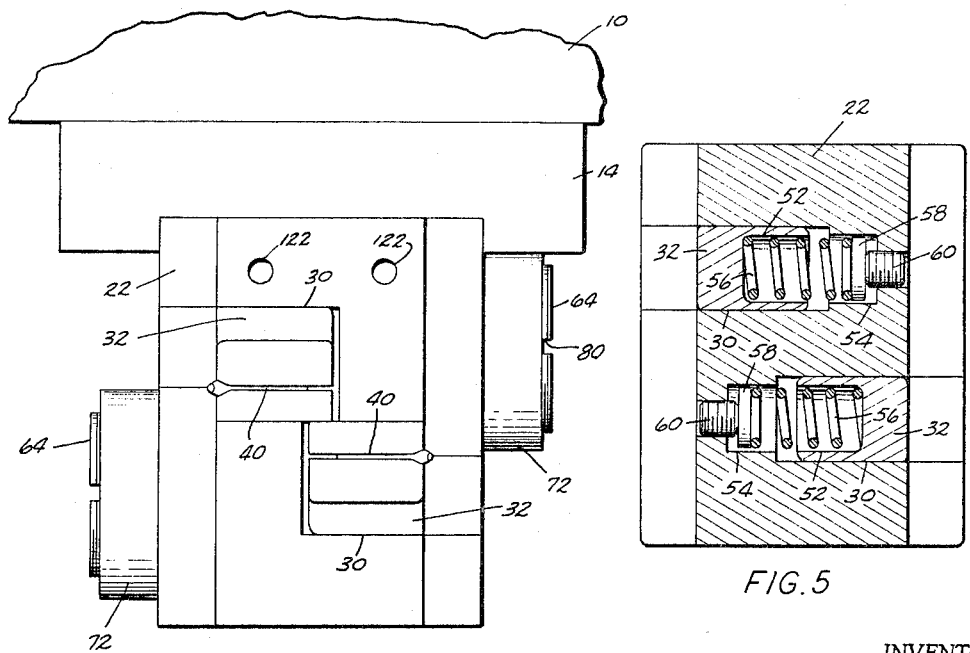
FIG. 3
FIG. 5
INVENTORS
ARTHUR L. ESTRY
SAMUEL M. WORTHINGTON
BY Deaman & Deaman
ATTORNEYS Nov. 1, 1966   A. L. ESTRY ET AL   3,281,919
DIAMOND BURNISHING APPARATUS
Filed Jan. 21, 1965   3 Sheets-Sheet 3

INVENTORS
ARTHUR L. ESTRY
SAMUEL M. WORTHINGTON
BY Beaman Beaman
ATTORNEYS

United States Patent Office 3,281,919
Patented Nov. 1, 1966

3,281,919
DIAMOND BURNISHING APPARATUS
Arthur L. Estry, Jackson, and Samuel M. Worthington, Grass Lake, Mich., assignors to Crankshaft Machine Company, Jackson, Mich., a corporation of Michigan
Filed Jan. 21, 1965, Ser. No. 426,871
10 Claims. (Cl. 29—90)

The invention pertains to apparatus for burnishing metal and particularly relates to such apparatus employing a diamond as the burnishing tool.

The bearing surfaces of crankshafts and similar rotating elements supported by or incorporating sleeve or sliding bearings must be provided with a highly finished surface to reduce wear and friction. In the manufacture of crankshafts, for instance, the bearing surfaces are normally ground to the final size to provide the finished bearing surface. While a grinding operation is capable of producing a bearing having an acceptable finished surface, minute particles of the grinding wheel often become embedded in the ground bearing surface. Of course, such minute abrasive particles are very detrimental in a bearing surface, and bearing failures can often be attributed to such particles.

It has been discovered that very acceptable bearing surfaces may be formed on crankshafts and other rotating elements, whether formed of cast iron or forged steel, by burnishing the surface with an industrial diamond. Diamond burnishing produces a very smooth surface wherein the "hills" of the surface are displaced into the "valleys" thereof to produce a highly finished surface well suited to serve as a sliding bearing. As the burnishing process does not remove metal, the manufacture of the bearing surfaces is readily accomplished, as the burnishing operation can be made after the surfaces have been accurately sized by turning. Also, another important advantage arising from the use of a diamond burnishing tool to prepare a bearing surface lies in the fact that no foreign matter, such as grinding wheel particles or the like, has an opportunity to contaminate the bearing surface.

It is, therefore, an object of the invention to provide a burnishing apparatus which is capable of producing a bearing surface of superior quality.

Another object of the invention is to provide burnishing apparatus which is of a concise configuration and dimension and may be readily employed with automatic crankshaft machines, or similar machines capable of automated control.

An additional object of the invention is to provide a diamond burnishing apparatus capable of burnishing spaced, opposed, radial bearing surfaces, and wherein the burnishing operation can be accomplished during one "pass" of the diamond over the bearing surface.

A further object of the invention is to provide a diamond burnishing apparatus wherein the diamond is maintained in engagement with the surface being burnished by a biasing action and the diamond may be considered to "float" during the burnishing operation.

Yet another object of the invention is to provide a burnishing apparatus wherein vibration dampening means are employed with the burnishing tool supporting components to minimize chatter and vibrations which may adversely affect the surface being produced.

Figure 6:
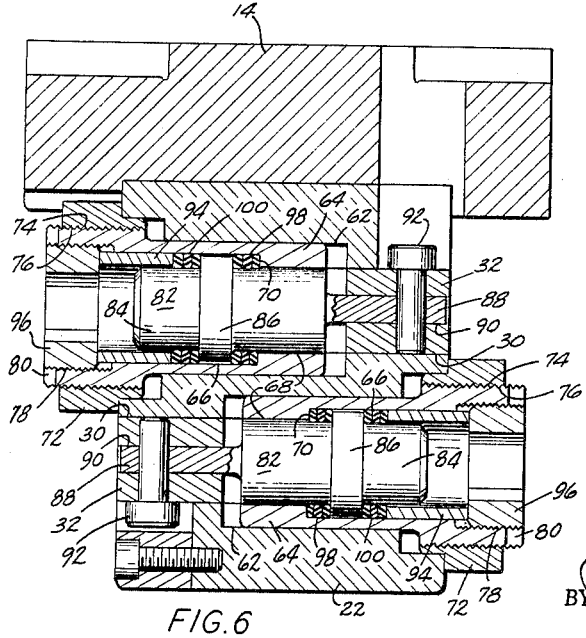
Figure 8:
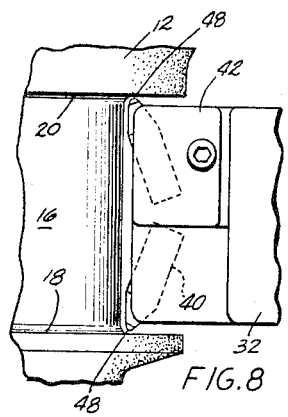

These and other objects of the invention arising from the details and relationships of the components of an embodiment thereof will be apparent from the following description and accompanying drawings wherein:

FIG. 1 is an elevational view of a burnishing apparatus in accord with the invention as working on radial crankshaft bearing surfaces, the crankshaft being shown in phantom lines, FIG. 2 is a plan, sectional view of the burnishing apparatus constructed in accord with the invention as taken along section II—II of FIG. 1, FIG. 3 is a front, elevational view of the burnishing apparatus in accord with the invention, FIG. 4 is a plan, sectional view illustrating the configuration of the lower tool-supporting lever as taken along section IV—IV of FIG. 1, a portion of the lever being broken away to illustrate the lever biasing springs, FIG. 5 is an elevational, sectional view illustrating the tool lever biasing springs as taken along section V—V of FIG. 1, FIG. 6 is an elevational, sectional view of the vibration dampening means taken along section VI—VI of FIG. 1, FIG. 7 is a rear view of the burnishing apparatus in accord with the invention, a portion of the back plate being broken away to illustrate the tool retracting mechanism, FIG. 8 is an enlarged, detail, plan view of the burnishing tools as retracted at the end of the burnishing operation and prior to withdrawal from the crankshaft, and FIG. 9 is a view similar to FIG. 8 illustrating the relationship of the burnishing tools to the bearing surfaces to be burnished prior to the burnishing operation and engagement of the tools with the crankshaft.

The burnishing apparatus in accord with the invention is intended to be of such nature as to be readily employed with conventional turning machines, such as crankshaft turning machines. As such, it must be of a concise nature as to be mountable upon a machine cross slide and capable of being moved toward and away from the rotating workpiece. In FIG. 1, the supporting members for the burnishing apparatus are illustrated as including a vertically disposed plate 10 having an upper end affixed to a crankshaft machine slide, not shown, whereby the burnishing apparatus is capable of being moved toward and away from the axis A of a rotating crankshaft 12 supported upon the machine. A block 14 is keyed to the plate 10 and extends in a horizontal manner wherein the plate 10 and the block 14 constitute the means for attaching the burnishing apparatus to the crankshaft machine.

The configuration of the bearing surfaces being worked upon by the illustrated embodiment will be best appreciated from FIGS. 2, 8 and 9. The crankshaft 12 includes a cylindrical bearing surface 16.

A pair of parallel spaced, radial thrust bearing surfaces 18 and 20 are also defined upon the crankshaft and intersect the bearing surface 16 through radiused fillets. The surfaces 18 and 20 are normally associated with thrust bearings adapted to compensate for axial forces imposed upon the crankshaft, such as by a clutch, when the crankshaft is used in an automotive engine or the like. The burnishing apparatus embodiment described is of such construction as to burnish the bearing surfaces 18 and 20 simultaneously. It will be appreciated that the concepts of the invention may be employed to burnish other types of surfaces than those illustrated and the following description is only for purposes of illustration.

The burnishing apparatus includes a support body 22 which is affixed to the underside of the block 14 and the plate 10 by screws 24. A key groove 26 is defined in the upper surface of the support body 22 for cooperation with a key 28 mounted on the underside of the block 14. The support body 22 is of a somewhat elongated configuration and includes a pair of recesses 30 defined therein which extend longitudinally of the body, a recess intersecting each longitudinal side of the support body. The recesses 30 each receive a lever 32 which serves as the support for a diamond burnishing tool. The levers 32 are of identical configuration and the shape thereof will be best appreciated from FIG. 4. The levers each include a rear end portion 34 having a notch 36 defined therein for receiving a cam block, as will later be described. The front end portion of the levers 32 includes a diagonally disposed groove 38 defined by perpendicularly intersecting surfaces. The groove 38 is for the purpose of receiving the square-shanked diamond holder 40, and a cap 42 having a similar groove 44 defined therein is adapted to be affixed to each lever 32 by a screw 46. In this manner the tool holder 40 may be received within the square cross-sectional recess defined by the grooves 38 and 44 and firmly affixed to the associated lever upon tightening of the screw 46. The tool holder 40 is provided with an industrial diamond 48 suitably affixed in the end thereof. As will be apparent from FIGS. 8 and 9, the diamond 48 has a spherical working surface.

Each of the levers 32 is pivotally mounted within its respective support body recess 30 by means of a pivot pin 50 vertically extending through a lever-receiving recess. In this manner the levers 32 are pivotally mounted upon the support body 22 for pivotal movement in a horizontal plane, as viewed in FIG. 1.

Each of the levers 32 is provided with a pair of blind cylindrical holes 52 adjacent the tool end. The support body 22 is also provided with blind cylindrical recesses 54 which align with holes 52 and define a chamber therewith in which compression springs 56 are located. Spring pads 58 are located within the recesses 54, and a threaded screw 60, threaded into a bore defined in the support body, engages a pad 58 to adjustably regulate the compression produced by the springs 56. It will, therefore, be appreciated that as a pair of springs 56 is associated with each lever 32, the lever's front ends and tools are biased in an axial direction with respect to the crankshaft 12.

Vibration dampening components are mounted within a pair of cylindrical recesses 62 transversely disposed within the body member 22, as will be apparent from FIGS. 4 and 6. The vibration dampening components are identical and include a cylindrical casing 64 having an enlarged bore 66 and a reduced diameter bore 68. A radial shoulder 70 defines the axial definition of the bores 66 and 68. A collar 72 is affixed to each side of the support body 22, having a threaded bore 74 coaxial with an associated cylindrical recess 62. The casing 64 is provided with external threads 76 adapted to mate with the threads 74. The casings 64 are also internally threaded at 78, and are notched at 80 at their outer ends to receive a spanner wrench to permit rotation of the casing within the associated collar 72 and recess 62.

A plunger 82 is slidably mounted within each casing 64. The plunger includes a cylindrical body 84 adapted to be guided and slidingly supported within the bore 68. A radially extending annular projection 86 is defined on the plunger 82, having a maximum diameter slightly less than the diameter of the casing bore 66. The plungers 82 are each provided with a flattened extension 88 adapted to be received within a slot 90 defined in each of the levers 32. A pivot pin 92 pivotally connects the extension 88 to the associated lever 32.

Annular resilient vibration dampening elements 98 are interposed between the casing shoulder 70 and the plunger projection 86. Similar annular resilient vibration dampening elements 100 are interposed between the other side of the plunger projection 86 and an annular sleeve 94 slidably received within the casing bore. A threaded plug 96, threaded into the threaded bore 78 of the casing 64, abuts the end of the sleeve 94 to position the sleeve relative to the casing 64 and to adjust the degree of compression of the resilient vibration dampening elements. In the illustrated embodiment, the vibration dampening elements 98 and 100 consist of two sets of three O-rings each. It will be appreciated that the particular configuration and type of the vibration dampening elements does not form a part of this invention and may take many acceptable forms.

By rotating the threaded plug 96, the compression and, thus, the vibration dampening characteristics of the resilient elements may be regulated.

Retraction of the burnishing tools in the axial direction of the crankshaft is produced by an expandable chamber motor 102 mounted upon the block 14, FIG. 1. The motor 102 may be of any conventional type operated by either pressurized air or fluid, and includes a movable piston 104, FIG. 7, extending through an opening 103 in block 14. A rectangular block 106, having a threaded bore and split in the longitudinal direction, is threaded upon the piston 104. A conical-surfaced cam 108 includes a threaded shank 110 threadedly received within the block 106 for movement with the piston. Upon tightening the bolts 112, the cam may be locked to the piston. The threaded shank 110 permits adjustment of the cam 108 relative to the piston 104 whereby the cam position may be regulated relative to the motor limits. The support body 22 is provided with a rectangular guiding recess 114 in which the block 106 is closely, slidably received, FIGS. 2 and 7. The rear end portions 34 of the levers 32 are each provided with a cam block 116 received within notch 36 and having an oblique cam surface 118 defined thereon. The blocks 116 are offset relative to their respective levers, whereby the cam surfaces will be in directly opposed relation, as is apparent from FIG. 7.

Upon the piston 104 being moved by the pressurized medium within the motor 102 to its lowermost position, shown in dotted lines in FIG. 7, the cam 108 engages cam surfaces 118, and the rear ends 34 of the levers 32 will be biased away from each other to "retract" the tools 48 toward each other in the axial direction of the crankshaft. Upon the piston 104 lifting the cam 108 to the position shown in full lines in FIG. 7, the springs 56 will pivot levers 32 to move the diamonds 48 away from each other with respect to the axial direction of the crankshaft to the "expanded" position.

It is to be understood that the pivoting of the levers 32 between the aforementioned "retracted" and "expanded" positions is very slight, and the levers may pivot only to such an extent as to move the diamonds in the neighborhood of $\frac{1}{32}$ of an inch in the axial direction of the crankshaft. Of course, any pivoting produced in the levers 32 necessitates movement of the vibration dampening plungers 82, and movement of the levers 32 in either direction is accomplished only by compressing one set or the other of the resilient vibration dampening elements mounted on opposite sides of the plunger projection 86.

Operation of the diamond burnishing apparatus in accord with the invention will now be described.

When mounted on a crankshaft turning machine, the burnishing apparatus movement will usually be timed as to directly follow the turning of the bearing surfaces 18 and 20. As the burnishing operation does not significantly vary the dimension of the spacing between the surfaces 18 and 20, that spacing desired may be turned. After the surfaces 18 and 20 have been turned, the machine slide, to which the plate 10 is affixed, moves the burnishing apparatus radially toward the crankshaft and the axis A. During this phase of the operation, the piston 104 will be withdrawn to the position shown in full lines in FIG. 7 to disengage the cam 108 from the cam surfaces 118. Thus, the springs 56 will be biasing the levers 32, and tools 48, away from each other in the axial direction of the crankshaft. Pivotal movement of the levers 32 under the influence of the springs 56 is limited by the resilient vibration dampening elements 98 and 100. The biasing force produced by the springs 56 tends to compress the resilient elements 100, and the springs 56 are of such strength as to produce sufficient compression to permit the desired movement of the levers 32.

The positioning of the diamonds in the fully "expanded" condition is regulated by the position of the casings 64 relative to the collars 72. This relationship is adjusted by rotating the casings with a wrench engaging notches 80. The casings are so located that upon disengagement of the cam 108 from the cam surfaces 118 and "expansion" of the tool end of the levers 32 under the influence of the springs 56, the distance X, FIG. 9, separating the working surfaces of the diamonds in the axial direction of the crankshaft, is slightly greater than the axial distance separating the bearing surfaces 18 and 20. Upon the burnishing tools being fed toward the crankshaft, the diamonds 48 engage with the crankshaft surfaces 18 and 20 which will displace the levers slightly to move the tools toward each other. Of course, such movement of the tools is accompanied by a corresponding pivotal movement of the levers 32, and will slightly relieve the compression on the relilient vibration dampening elements 100. The machine slide upon which plate 10 is mounted moves the burnishing apparatus toward the axis X, causing the diamond tools 48 to radially traverse the associated bearing surface and burnish the surface to an accurate bearing quality.

FIGS. 1 and 2 illustrate the position of the burnishing apparatus, tools and crankshaft, at substantially the end of the burnishing operation and before the tools have been retracted from their associated bearing surfaces. During the burnishing operation, it will be appreciated that the diamond burnishing tools will be held into engagement with the associated bearing surface by the biasing force produced by the springs 56. As the influence of the vibration dampening assemblies on the lever is of a resilient nature, the burnishing tools can be considered to have a "floating" support during the burnishing operation, thereby permitting the tools to very accurately follow the configuration of the associated bearing surface. Any vibrations which may tend to occur, such as chattering, or the like, are dampened by the resilient elements 98 and 100, and by tightening or unloosening the plugs 98, the vibration dampening characteristics produced by the elements 98 and 100 may be readily adjusted to accommodate the variables which may be encountered, such as whether cast iron or forged steel is being burnished.

At the end of the burnishing operation the tools will be adjacent the bearing surface 16, as shown in FIG. 2. As it is neither necessary nor desirable to move the burnishing apparatus away from the crankshaft while the tools are in engagement with the associated bearing surface, the tools are retracted from the associated bearing surface, as shown in FIG. 8, by energizing the motor 102 to engage the cam 108 with the cam surfaces 118 and bias the rear lever ends 34 away from each other, thereby moving the tools 48 toward each other in the axial direction of the crankshaft. Upon the tools being so "retracted," the burnishing apparatus may be very quickly withdrawn from the crankshaft, which is an important advantage with automated equipment.

Passages 120 and openings 122 may be defined in the support body 22 and the block 14 to permit an oil mist or other coolant to be applied to the bearing surfaces during burnishing. The coolant may be injected into the passages 120 from a conduit 124, FIG. 1. After the burnishing apparatus is completely withdrawn from the crankshaft 12, the motor 102 is energized to lift the cam 108 from the cam surfaces 118 to expand the levers and tools to the position shown in FIG. 9 in preparation for the next burnishing cycle.

In the disclosed embodiment, the levers 32 are mounted one above the other due to the fact that the spacing between the bearing surfaces 18 and 20 is not great enough to permit the levers to be mounted in a common horizontal plane. With sufficient spacing between the bearings 18 and 20, the support body could be readily modified to permit such a common horizontal mounting of the burnishing tools. The fact that the burnishing tools are not disposed within the horizontal plane of the axis A does not adversely effect the burnishing operation.

It is appreciated that various modifications to the invention may be apparent to those skilled in the art without departing from the spirit and scope thereof, and it is intended that the invention be defined only by the scope of the following claims.

We claim:
1. Burnishing apparatus comprising, in combination:
 (a) a support body,
 (b) a tool-supporting lever pivotally mounted upon said support body for selective pivotal movement about an axis in a tool retracting direction and a tool operative direction,
 (c) a burnishing tool mounted upon said lever, and
 (d) lever actuating means associated with said lever adapted to pivot said lever about said axis.
2. Burnishing apparatus comprising, in combination:
 (a) a support body,
 (b) a tool-supporting lever pivotally mounted upon said support body for selective pivotal movement about an axis in a tool retracting direction and a tool operative direction,
 (c) a burnishing tool mounted upon said lever,
 (d) first lever actuating means affixed relative to said support body adapted to pivot said lever in the tool retracting direction, and
 (e) second lever actuating means biasing said lever in the tool operative direction.
3. In a burnishing apparatus as in claim 2 wherein:
 (a) said second lever actuating means comprises a spring interposed between said support body and said tool-supporting lever.
4 Burnishing apparatus comprising, in combination:
 (a) a support body,
 (b) a tool-supporting lever pivotally mounted upon said support body for selective pivotal movement about an axis in a tool retracting direction and a tool operative direction,
 (c) a burnishing tool mounted upon said lever,
 (d) lever actuating means associated with said lever adapted to pivot said lever about said axis, and
 (e) vibration dampening means mounted on said support body affixed to said tool-supporting lever adapted to dampen vibrations occuring in said lever tending to pivot said lever about said axis.
5. In a burnishing apparatus as in claim 4 wherein:
 (a) said vibration dampener includes a linearly movable element mounted in said support body, said element being disposed transversely to said lever pivot axis.
6. Burnishing apparatus comprising, in combination:
 (a) a support body,
 (b) a tool-supporting lever pivotally mounted upon said support body for selective pivotal movement about an axis in a tool retracting direction and a tool operative direction,
 (c) a burnishing tool mounted upon said lever,
 (d) biasing means biasing said tool-supporting lever in the tool operative direction, and
 (e) resilient vibration dampening means mounted on said support body affixed to said tool-supporting lever adapted to dampen vibrations occurring in said lever, said biasing means placing said vibration dampening means under compression during operation of said burnishing tool.
7. In a burnishing apparatus as in claim 6:
 (a) adjustable compression means engaging said resilient vibration dampening means adapted to selectively vary the compression imposed thereon to adjust the characteristics of said vibration dampening means.

8. Burnishing apparatus adapted to simultaneously burnish a pair of spaced, opposed surfaces comprising, in combination:
   (a) a support body,
   (b) a pair of tool-supporting levers pivotally mounted upon said support body for selective individual pivotal movement about an associated axis in a tool retracting direction and a tool operative direction, each of said levers having an outer end and an inner end,
   (c) a burnishing tool mounted upon the outer end of each of said levers,
   (d) means fixed relative to said support body adapted to pivot said levers in the tool retracting direction,
   (e) biasing means acting upon each of said levers biasing said levers toward the tool operative position,
   (f) said tools being disposed adjacent each other and adapted to simultaneously engage the separate, opposed surfaces to be worked.

9. In a burnishing apparatus as in claim 8 wherein:
   (a) said means pivoting said levers in the tool retracting direction comprises an expandable motor including a movable piston,
   (b) a cam mounted upon said piston, and
   (c) cam engaging surfaces defined on each of said lever inner ends adapted to be engaged by said cam.

10. Burnishing apparatus adapted to simultaneously burnish a pair of spaced, opposed surfaces comprising, in combination:
   (a) a support body,
   (b) a pair of tool-supporting levers pivotally mounted upon said support body for selective individual pivotal movement about an associated axis in a tool retracting direction and a tool operative direction, each of said levers having an outer end and an inner end,
   (c) a burnishing tool mounted upon the outer end of each of said levers,
   (d) means fixed relative to said support body adapted to pivot said levers in the tool retracting direction,
   (e) biasing means acting upon each of said levers biasing said levers toward the tool operative direction,
   (f) vibration dampening means mounted on said support body affixed to each of said tool-supporting levers adapted to dampen vibrations occurring in said levers tending to pivot the levers about their associated pivot axis,
   (g) said tools being disposed adjacent each other and adapted to simultaneously engage separate, opposed surfaces to be worked.

No Reference Cited.

RICHARD H. EANES, JR., *Primary Examiner.*